US008538708B2

(12) United States Patent
Yadav et al.

(10) Patent No.: US 8,538,708 B2
(45) Date of Patent: Sep. 17, 2013

(54) FAST FAULT ISOLATION AND RESTORATION FOR DISTRIBUTION NETWORKS

(75) Inventors: Navindra Yadav, Cupertino, CA (US); Shmuel Shaffer, Palo Alto, CA (US); Nitin Nayar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 347 days.

(21) Appl. No.: 13/021,932

(22) Filed: Feb. 7, 2011

(65) Prior Publication Data

US 2012/0203479 A1 Aug. 9, 2012

(51) Int. Cl.
*G06F 19/00* (2011.01)
(52) U.S. Cl.
USPC ............................................................ 702/58
(58) Field of Classification Search
USPC ........................................................ 702/58
See application file for complete search history.

(56) References Cited

U.S. PATENT DOCUMENTS

2010/0161151 A1* 6/2010 Yang et al. ..................... 700/297
2012/0041696 A1* 2/2012 Sanderford et al. ............ 702/62

* cited by examiner

*Primary Examiner* — Bryan Bui
(74) *Attorney, Agent, or Firm* — P. Su

(57) ABSTRACT

In one embodiment, a method includes obtaining information relating to a steady state operation of a portion of an electrical network, the electrical network including a plurality of components, the information being obtained from the plurality of components while the portion of the electrical network is operating at steady state, wherein the information is obtained through a communications network that at least partially overlays the electrical network. The method also includes detecting a fault in the electrical network, isolating the location of the fault, and restoring the electrical network. The fault is detected by at least a first component of the plurality of components. Restoring the electrical network includes determining when the first component owns the fault. Determining when the first component owns the fault includes at least processing the information obtained from the plurality of components.

24 Claims, 14 Drawing Sheets

FAST FAULT ISOLATION AND RESTORATION FOR DISTRIBUTION NETWORKS

The disclosure relates generally to the distribution of electricity in an electrical network and, more particularly, to providing an efficient and effective method for isolating faults in an electrical network.

BACKGROUND

Utility companies generally utilize electrical networks to distribute electricity to customers, e.g., customers living in specific neighborhoods. When faults occur in an electrical network, customers may experience power outages. Some faults may be transient in nature, and generally will clear without external intervention. For example, a fault that occurs when a tree branch comes into contact with a power line may clear on its own when the tree branch burns. Other faults may be substantially permanent, and may require intervention in order to correct the faults.

When a grid that is part of an electrical network detects a fault in the form of a high current rush on a feeder or a line from a substation, the grid generally promptly protects itself by opening switches on the faulty feeder or line in order to cut off the high current rush. As a result, customers that obtain electricity from the feeder on which the fault is detected lose power until the location of the fault is identified, the particular segment of the feeder that includes the fault is isolated, and alternate routes are identified to provide electricity to the customers.

Algorithms which are used to identify the location of a fault, to isolate the fault, and to restore power to affected customers through alternate feeders generally require repeatedly opening and closing time-sensitive switches, as well as inflicting numerous high current pulses. That is, existing algorithms used to restore power to customers that have lost power due to a fault in a feeder often require opening and closing switches, and the application of high current pulses, in order to identify the location of the fault. Such algorithms are time-consuming and inefficient. As a result, such algorithms are typically also inconvenient and, hence, undesirable to customers.

Therefore, what is needed is a method and an apparatus that may efficiently locate faults, isolate faults, and restore power to customers that are affected by the faults. That is, what is desired is a method and an apparatus for dealing with faults in electrical networks that substantially minimizes inconvenience to customers.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
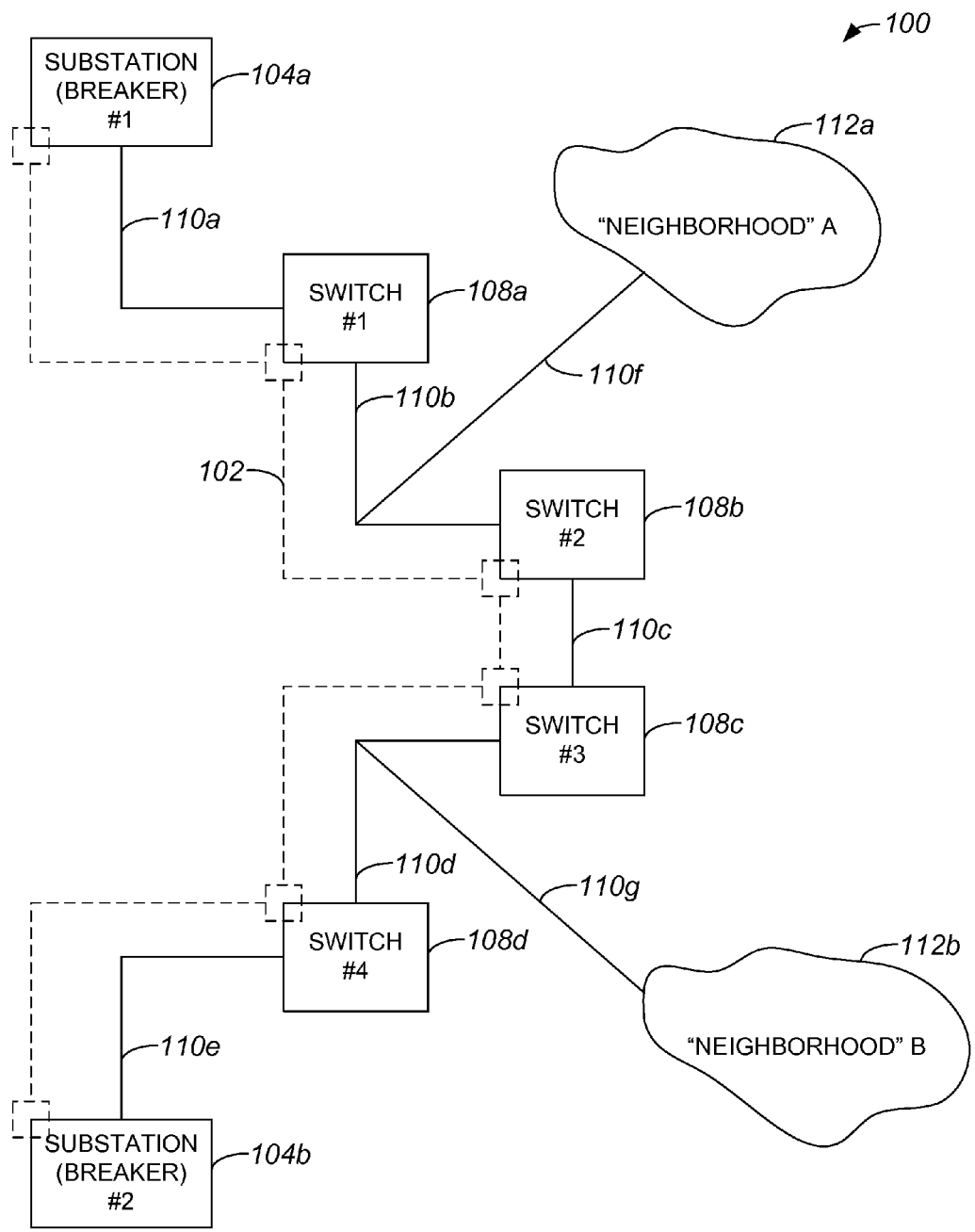
FIG. 1 is a block diagram representation of an electrical network in accordance with an embodiment.

According to one aspect, a method includes obtaining information relating to a steady state operation of a portion of an electrical network, the electrical network including a plurality of components, the information being obtained from the plurality of components while the portion of the electrical network is operating at steady state, wherein the information is obtained through a communications network that at least partially overlays the electrical network. The method also includes detecting a fault in the electrical network and restoring the electrical network. The fault is detected by at least a first component of the plurality of components. Restoring the electrical network includes determining when the first component owns, e.g., assumes responsibility for, the fault. Determining when the first component owns the fault includes at least processing the information obtained from the plurality of components.

Description

Processing recent information relating to the steady state operation of an electrical network prior to any fault being detected on the electrical network enables information that is useful to detect and isolate a fault, and to restore the electrical network, to be readily available after a fault is detected. Thus, when a fault is detected and isolated, little or no communication and/or computation may be needed in order to determine how best to restore power to customers. As such, power may be promptly restored.

By substantially eliminating the need to open and close switches that are part of an electrical network in an effort to detect and isolate faults, the speed at which faults may be detected and isolated may be improved. In addition, by eliminating the need to inflict numerous high current pulses through an electrical network as a part of a restoration process, the time and inconvenience associated with restoring the electrical network may also be reduced.

In one embodiment, an overall method of fast fault isolation and restoration within an electrical network includes three phases. A first phase occurs during steady state operation of the electrical network, e.g., prior to any faults being detected, information relating to the electrical network is processed and stored for later use, e.g., use after faults are detected. By way of example, contingency planning that preprocesses information relating to the electrical network may occur such that after a fault is identified, a predetermined contingency plan may effectively be implemented. A second phase occurs when a fault is detected, and in response to the fault, the electrical network is substantially protected. A third phase occurs when the detected fault is isolated, and power may be restored within the electrical network using the information processed and stored during steady state operation of the electrical network. For instance, a contingency plan developed during steady state operation of the electrical network may be implemented.

Utilizing peer communication and distributed processing to isolate faults and to perform fault isolation, the time required to restore power to an electrical network or power grid after a fault is detected may be reduced. For example, a fault may be located and isolated, and restoration may occur, on the order of milliseconds. In one embodiment, pre-fault processing, or processing that occurs in advance of a fault being detected, may be used to assess contingency plans, thereby reducing the time needed for an electrical network to converge after a fault occurs.

Using local messages sent between peers, e.g., neighboring components such as switches and/or routers in an electrical network, a fault within the electrical network may be identified. Thus, in order to identify a fault, components may utilize information relating to neighbors, and generally do not require the use of information relating to the topology of the electrical network or, more specifically, an associated feeder loop of the electrical network. The efficiency with which a fault may be isolated and restored is improved, as components generally do not need to exchange and synchronize information after a fault is detected.

Referring initially to FIG. 1, an electrical network in accordance with an embodiment. An electrical network 100 or a grid includes a plurality of substations 104a, 104b, e.g., power substations, that are arranged to provide electricity throughout network 100. As will be appreciated by those skilled in the art, substations 104a, 104b generally include circuit breakers (not shown). Substations 104a, 104b are electrically coupled to line switches 108a-108d that includes sensors (not shown) and fault detectors (not shown). Sensors (not shown) may generally be configured to sense an amount of electricity, e.g., to determine a current level and/or a voltage level, while fault detectors (not shown) may be identified to sense when an abnormal condition, such as a high current rush, occurs. Each switch 108a-108d is arranged to open when a fault such as a high current rush occurs, e.g., when an abnormally high amount of current is sensed.

Switches 108a-108d are connected to each other, and to substations 104a, 104b, through lines 110a-110e that carry electricity within network 100. Lines 110f, 110g are arranged to carry electricity to neighborhoods 112a, 112b or, more generally, to sub-networks that supply neighborhoods 112a, 112b with power. Neighborhoods 112a, 112b generally include customers who obtain electricity through lines 110f, 110g.

A communications network 102, which may be an Internet protocol (IP) network, substantially overlays electrical network 100. Communications network 102 enables information obtained by substations 104a, 104b, as well as sensors (not shown) associated with switches 108a-108d, to be communicated. For example, information associated with a switch 108a-108d may be communicated to other switches 108a-108d through communications network 102. As will be discussed below, when a switch 108a-108d determines that it may serve as a parent node in the event of a fault, that information may be communicated to other switches 108a-108d and to substations 104a, 104b through communications network 102. Communications network 102 may include nodes (not shown), as for example routers, that are substantially incorporated into substations 104a, 104b and switches 108a-108d, and/or may includes nodes (not shown) that are configured to obtain information either directly or indirectly from substations 104a, 104b and switches 108a-108d. Communications network 102 includes, in one embodiment, a distributed computing and storage arrangement (not shown). Such a storage arrangement may be integrated into routers comprise communications network 102, or may instead be substantially attached to communications network 102."

When network 100 is operating normally or at a substantially steady state, e.g., when there are no faults detected within network 100, substations 104a, 104b and switches 108a-108d may obtain and substantially process sensory information relating to the flow of electricity within network 100. For example, each switch 108a-108d may identify a steady state current flowing through each switch 108a-108d. It should be appreciated that sensory information may be obtained and processed periodically, such that an actual state of a network may substantially always be reflected.

By obtaining and processing sensory information periodically, while an electrical network is operating substantially at steady state, the sensory information will be readily available for use once a fault is detected. After a fault is detected, stored sensory information, e.g., current or voltage measurements, may be used to identify appropriate switches to essentially take ownership of the fault. It should be appreciated that by taking ownership of a fault, a given switch may effectively notify a grid that the given switch has detected a high current rush or a fault current, and that the given switch likely has the capability to stop the current rush or fault current by opening. In one embodiment, the electrical network is effectively implementing contingency planning. In effect, contingency planning may be substantially continuously occurring. Contingency planning may effectively scan through all of the segments, e.g., links between switches, and calculate or otherwise determine a substantially optimal recovery and restoration plan that may be implemented in the event that a fault occurs on any given segment.

Figure 2:
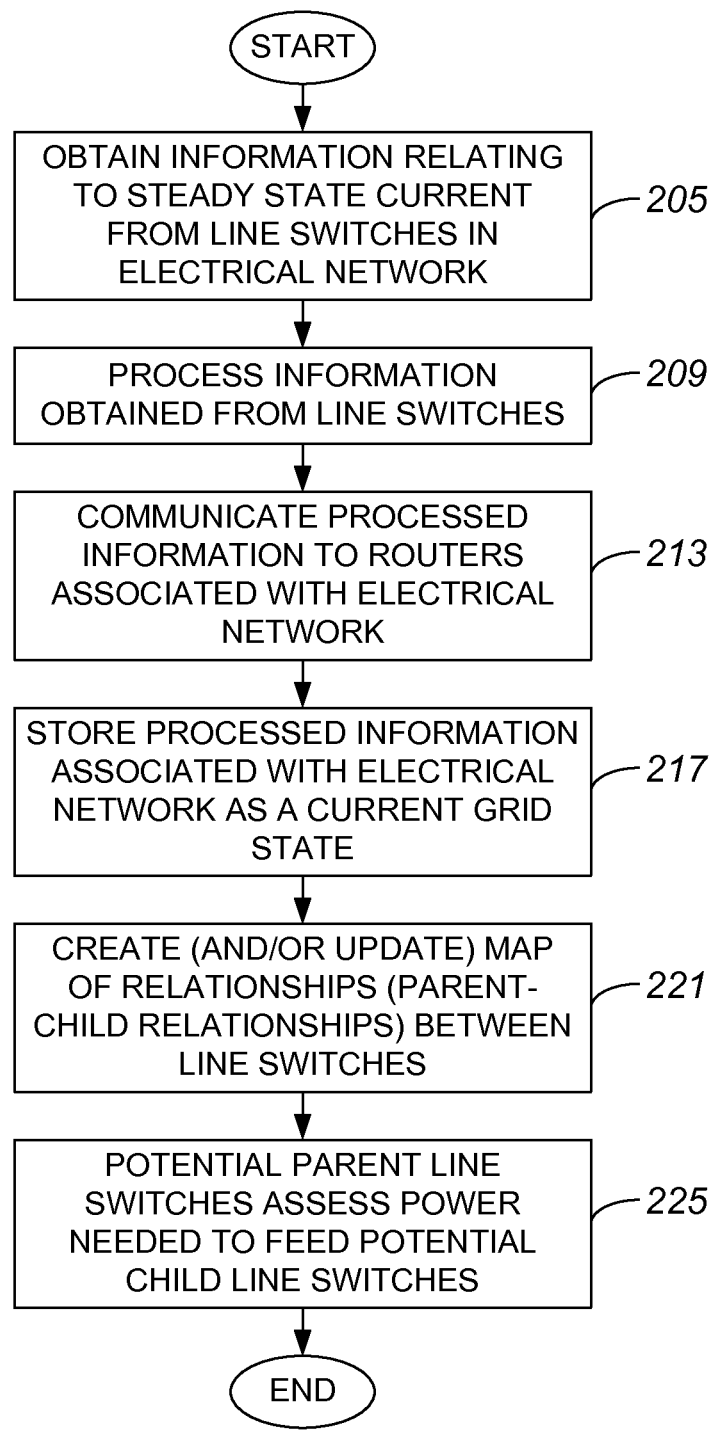
FIG. 2 is a process flow diagram which illustrates a general method of processing information relating to fault detection and grid protection during steady state operation of an electrical network in accordance with an embodiment.

FIG. 2 is a process flow diagram which illustrates a general method of processing information relating to fault detection and grid protection during steady state operation of an electrical network in accordance with an embodiment. A method 201 of processing information while an electrical network is operating substantially at steady state begins at step 205 in which information relating to steady state current is obtained from line switches or, more specifically, sensors associated with the line switches in an electrical network. In one embodiment, each switch in a network effectively measures its steady state current level, and may report its steady state current level to every other switch and substation in the network. In another embodiment, each switch may instead report its steady state current level to a designated master node, e.g., a substation or a particular switch. The steady state current level may be measured by each switch using a sensor associated with the switch. Information relating to the steady state current level at each switch may be communicated, e.g., to all other switches or to a master node, using routers in a communications network such as communications network 102 of FIG. 1.

In step 209, information obtained from sensors associated with switches may be processed. Processing the information may include comparing information shared by a plurality of switches to identify potential parent-child relationships between switches that may be implemented in the event of a fault, and time-stamping the information to provide for a time-based view of an overall system state. In one embodiment, the terminology "parent-child" is used in the present disclosure to denote energy flow relationships between subsequent switches, although it should be appreciated that electric power generally flows towards a child switch from its parent switch. Processing the information may also include calculating the power consumed by customers who draw power from each link or grid segment, such as the power delivered to neighborhood 112*b* via line 110*g*, as shown in FIG. 1.

After the information obtained from switches is process, the process information is communicated to routers associated with the electrical network in step 213. As previously mentioned, each switch generally either includes a router or is associated with a router. Each router may store, in step 217, the processed information as a current grid state. It should be appreciated that in lieu of each router storing the processed information, the processed information may instead be stored in substantially any distributed storage arrangement, e.g., memory, or other arrangement that is associated with the electrical network and with a corresponding communications network such as communications network 102 of FIG. 1.

Once a current grid state is stored, e.g., by each router, a map of relationships between line switches may be created and/or updated in step 221. Creating and/or updating a map of relationships may include substantially defining parent-child relationships between switches and, more generally, may include establishing a network topology. That is, potential parent switches may be identified, and child switches associated with those potential parent switches may also be identified.

In step 225, potential parent switches may assess power needed to feed potential child switches. It should be appreciated that such assessments may be made by routers, e.g., logic embedded in or otherwise associated with routers, or other computing systems, associated with the potential parent switches. By way of example, it may be determined how much power each switch would need to supply to feed each of its potential child switches in the event a fault is detected. When such a determination is made prior to a need arising, e.g., prior to a fault actually being detected, the efficiency, e.g., speed, with which a fault may be processed is increased. Upon assessing power needed to feed potential child switches, a method of processing information while an electrical network is operating substantially at steady state is completed.

Figure 3:
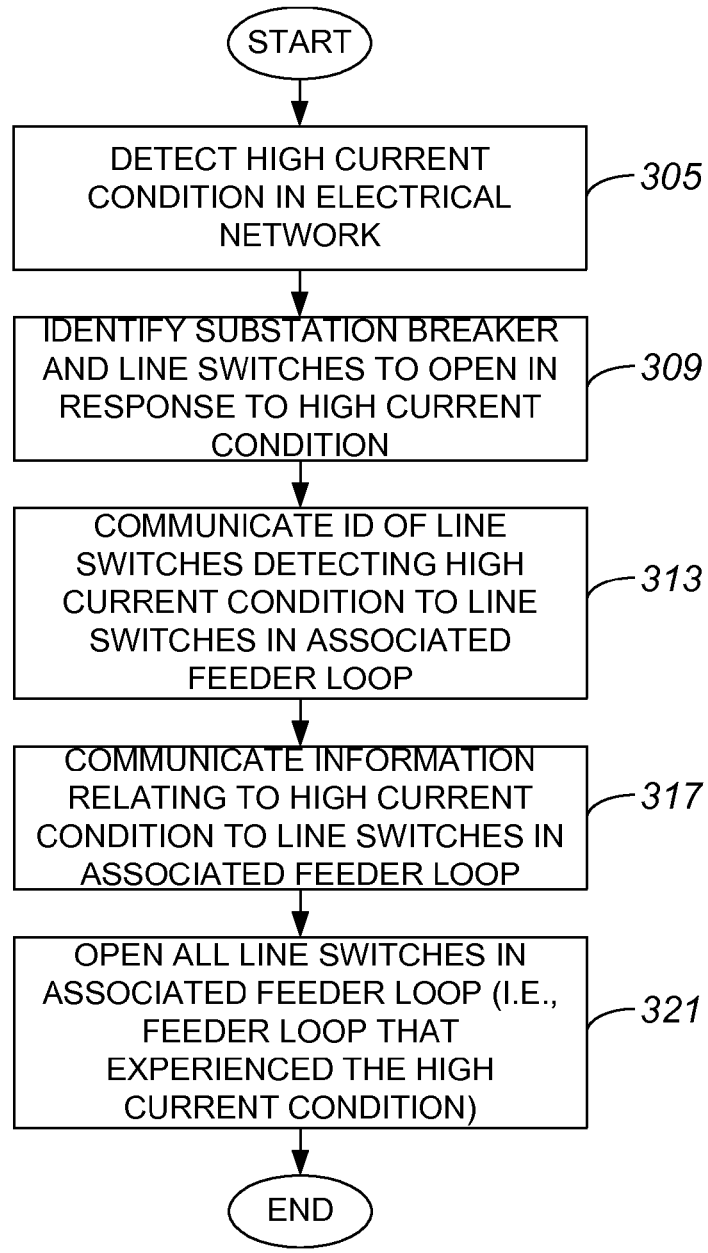
FIG. 3 is a process flow diagram which illustrates a general method of detecting a fault in an electrical network and protecting the electrical network in accordance with an embodiment.

In general, when a component in a system, as for example a substation or a switch in an electrical network, detects a fault, substantially all breakers and switches associated which experience the fault open to protect the electrical network. With reference to FIG. 3, a general method of detecting a fault in an electrical network and protecting the electrical network in accordance with an embodiment. A method 301 of detecting a fault and protecting an electrical network begins at step 305 in which a high current condition is detected in the electrical network. It should be appreciated that although a high current condition is described, a fault may generally be detected based upon an abnormal current condition. Then, in step 309, a substation breaker and line switches that are associated with a feeder loop of the electrical network on which the fault is detected are identified. It should be appreciated that such a substation breaker and line switches are identified as components of the feeder loop that should be at least temporarily opened to prevent damage to the overall electrical network.

From step 309, process flow moves to step 313 in which the identification (ID) of switches that detected the high current condition or, more generally, an abnormal current condition, is communicated to all other switches in the feeder loop, as well as to the associated substation breaker. Information relating to the detected high current condition is also communicated, in step 317, to the line switches in the feeder loop and to the associated substation breaker. The information relating to the detected high current condition may include, but is not limited to including, an indication that a high current condition was detected and an amount of current that was measured. In one embodiment, the ID of line switches detecting a high current condition, as well as information relating to the high current condition, may be communicated in a fault message sent through a communications network that overlies the electrical network.

After information relating to a high current condition is communicated, all switches in the feeder loop, i.e., the feeder loop which experienced the fault current, are opened in step 321. Once the switches in the feeder loop which experienced the fault current are opened, the method of detecting a fault and protecting an electrical network is completed.

Figure 4A:
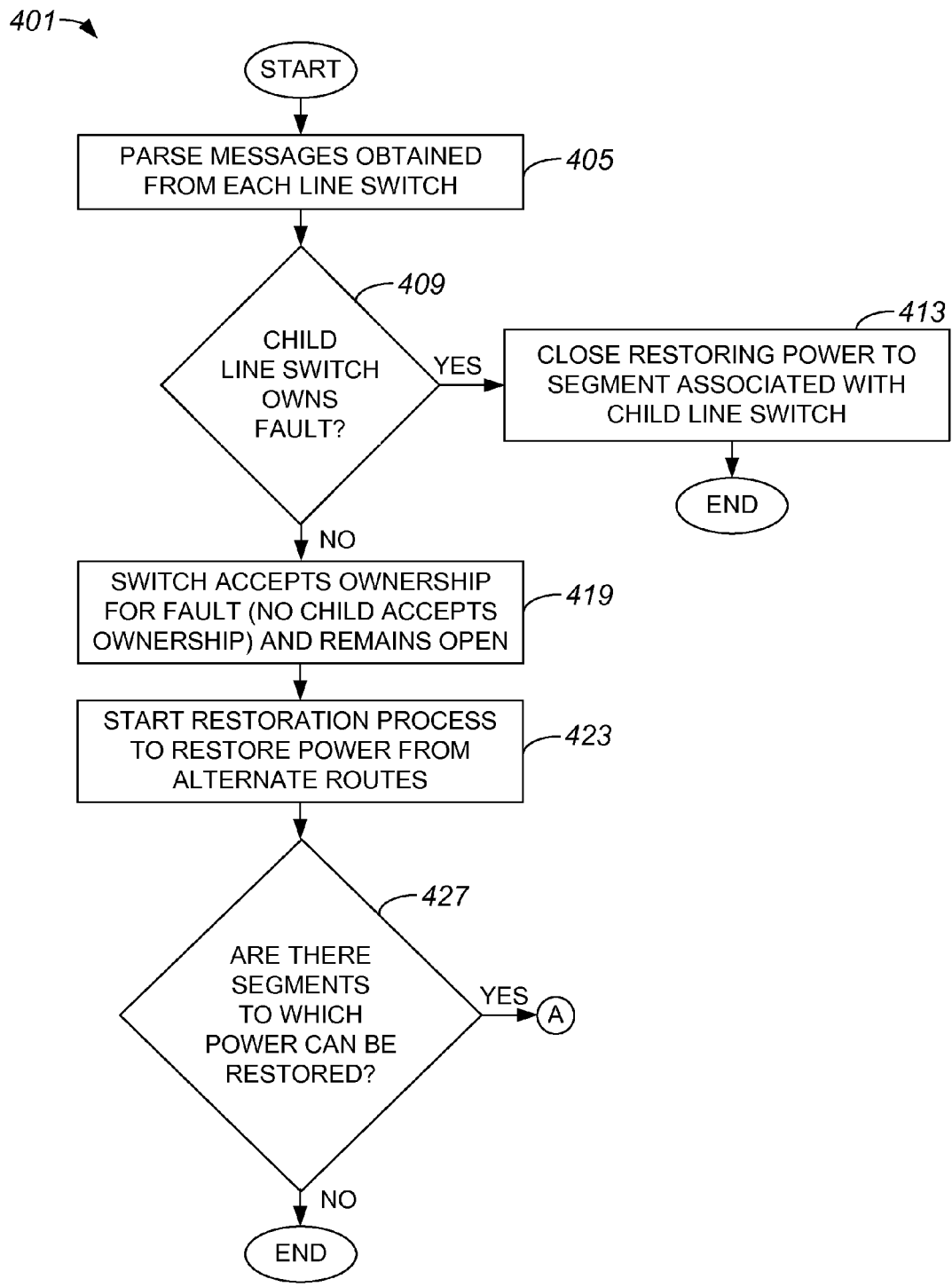
FIGS. 4A and 4B are a process flow diagram which illustrates a general method of performing fault isolation and restoration in accordance with an embodiment.
Figure 4B:
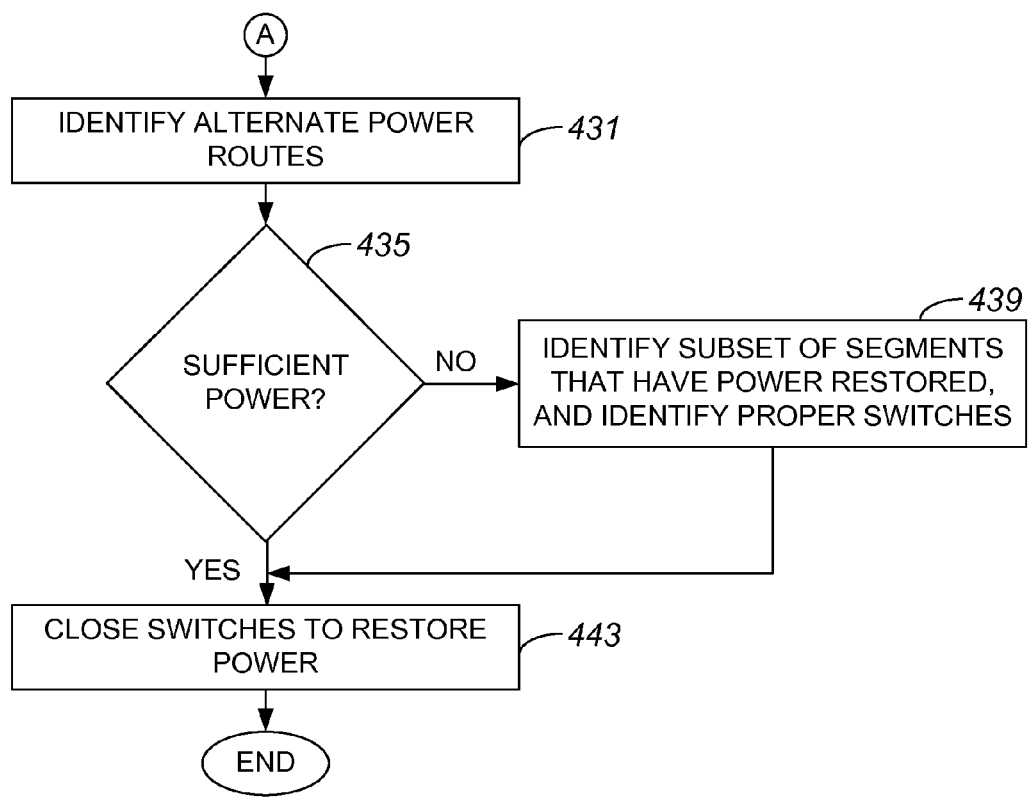

FIGS. 4A and 4B are a process flow diagram which illustrates a general method of performing fault isolation and restoration in accordance with an embodiment. In the described embodiment, the general method is from the point of view of a particular component, e.g., a line switch module or a substation, within an electrical network or grid that is open. The particular component may be open, e.g., may have a switch that is open, as a result of a fault being detected. A general method 401 of performing fault isolation and restoration begins at step 405 in which a particular switch or substation parses messages obtained from each line switch. The messages may be fault messages, as will be discussed below with respect to FIG. 5, or substantially any suitable notification that a neighbor switch is willing to take ownership of a detected fault.

In step 409, it is determined whether a switch that is a direct child of the particular switch has indicated that it, i.e., the child line switch, accepts ownership of the fault. If the determination is that the child switch is willing to take ownership for the fault, then the indication is that the particular switch or substation breaker is not the owner of the fault and, hence, does not need to remain open. Thus, if a child switch has accepted ownership of the fault, restoring power is closed to the segment associated with the child switch in step 413, and the process of performing fault isolation and restoration is completed.

Alternatively, if it is determined in step 409 that no child switch accepts ownership the fault, then process flow moves to step 419 in which a switch, e.g., a parent switch, accepts ownership of the fault and remains open. Then, a restoration process starts in step 423 such that power may be restored from alternate routes.

A determination is made in step 427 as to whether there are segments to which power may be restored. If the determination is that there are no segments to which power may be restored, then the method of performing fault isolation and restoration is completed. On the other hand, if the determination in step 427 is that there are segments to which power may be restored, process flow moves to step 431 in which alternate power routes are identified. It is then determined in step 435 whether sufficient power is available. If it is determined that sufficient power is available, process flow proceeds to step 443 in which switches, e.g. appropriate switches, are closed to restore power. In one embodiment, if sufficient power is identified in step 435 to effectively power substantially all of an overall electrical network, then switches will be closed as appropriate to restore power to substantially all of the overall electrical network. Upon closing switches, the general method of performing fault isolation and restoration is completed.

Returning to step 435, if the determination is that there is insufficient power, a subset of segments that have power restored is identified, and proper switches are identified. That is, switches that are associated with segments that have power restored thereon are identified. Once the subset of segments that have power restored is identified, process flow moves to step 443 in which switches, e.g., the switches identified in step 439, are closed to restore power.

Figure 5:
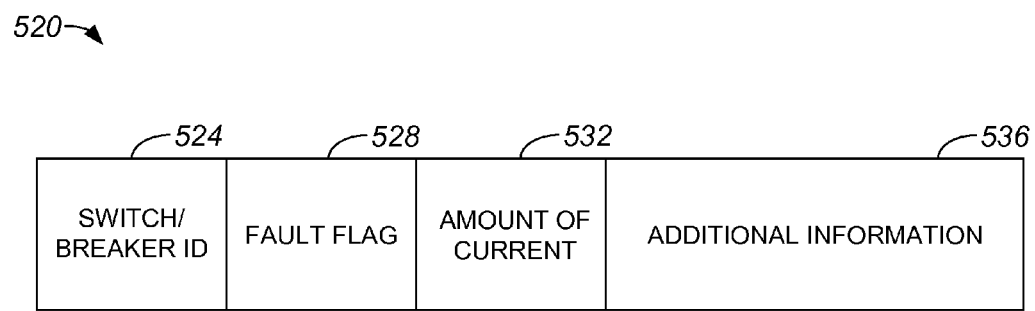
FIG. 5 is a diagrammatic representation of a fault message in accordance with an embodiment.

In one embodiment, when it is determined that a particular switch has detected a fault, e.g., a high current condition, a fault message may be sent through a feeder loop that substantially encompasses the fault Generally, information is exchanged between, shared by, and/or propagated to substantially all components associated with the feeder loop. The message exchange may take place over, but is not limited to taking place over, PLC, optical, wired, and/or wireless connections. For example, a switch may detect a fault in a feeder loop and then send a fault message to other switches that are associated with the feeder loop. FIG. 5 is a diagrammatic representation of an example of a fault message in accordance with an embodiment. A fault message 520 typically includes, but is not limited to including, a switch ID or a breaker ID 524, a fault flag 528, and an amount of current 532. Switch or breaker ID 524 is arranged to identify a switch or a breaker that detected a fault. Fault flag 528 is arranged to indicate the type of fault sensed by the switch or breaker identified by switch or breaker ID 524. For example, a fault may be substantially identified as two wires touching each other, or a power line touching the ground. In addition, or alternatively, a fault condition may indicate whether a switch experienced a high current condition or a power loss, e.g., a low voltage. Amount of current 532 typically indicates the current level associated with the fault that was sensed, e.g., the current level associated with a high current condition. It should be appreciated that fault message 520 may also include additional information 536. Data and/or indications contained in additional information 536 may vary widely. For example, additional information 536 may include, but is not limited to including, data and/or indications that are typically contained in a message header. In one embodiment, additional information 536 may include a time stamp field.

With reference to FIGS. 6A-6G, the overall operation of an electrical network during steady state, during fault detection, and during fault isolation and restoration will be described in accordance with an embodiment. It should be appreciated that the electrical network shown in FIGS. 6A-6G is one example of a suitable electrical network, and is shown for illustrative purposes. An electrical network or, more specifically, the number of components and links associated with an electrical network, may generally vary widely.

Figure 6A:
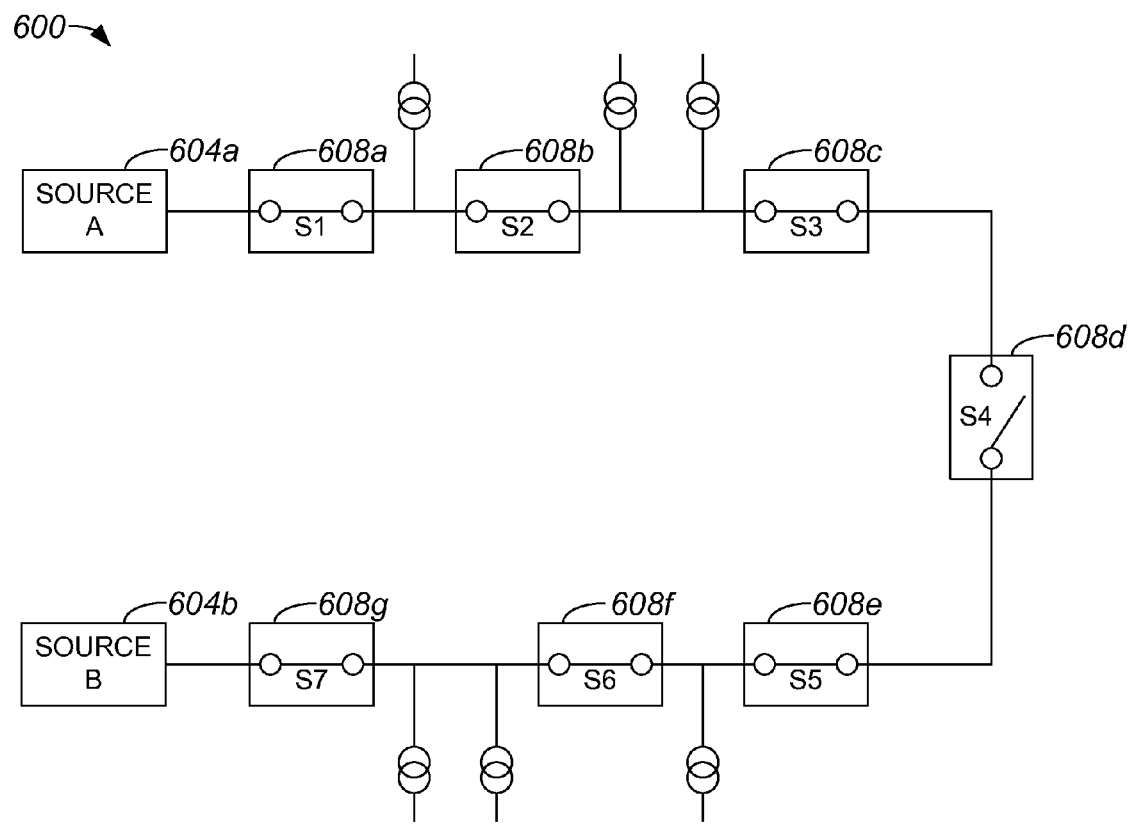
FIG. 6A is a diagrammatic representation of an electrical network at a time t1 when the electrical network is operating in a steady state in accordance with an embodiment.

FIG. 6A is a diagrammatic representation of an electrical network at a time t1 when the electrical network is operating in a steady state in accordance with an embodiment. In general, when an electrical network is operating in a steady state, substantially no faults have been detected within the electrical network. An electrical network 600 includes sources 604a, 604b which are generally power substations that include circuit breakers. Switch modules 608a-608g generally include switch capabilities, sensing capabilities, and fault detecting capabilities. One example of a switch module such as switch modules 608a-608g will be described below with respect to FIG. 7.

Sources 604a, 604b and switch modules 608a-608g are connected through electrical and communications links. Communications links may be, but are not limited to being, peer-to-peer radio links, hub and spoke radio links, and fiber optical links. In the described embodiment, switch modules 608a-608g each include a router. It should be appreciated, however, that each switch module 608a-608g may each instead be associated with a router (not shown) that is a substantially separate component. It should be also appreciated that grid routers may include logic which substantially improves fault location, isolation, and/or restoration, in addition to communications logic.

In the embodiment as shown, switch 608d is in an open configuration when network 600 is operating in a steady state. Hence, electricity flows through switches 608a-608c from source 604a, while electricity flows through switches 608e-608g from source 604b. Thus, customers whose power supply may be cut off by switches 608a-608c are effectively supplied with power by source 604a, and customers whose power supply may be cut off by switches 608e-608g are effectively supplied with power by source 604b.

During steady state operation, sensors associated with switches 608a-608g may periodically exchange values, e.g., values associated with current and/or voltage measurements. Measurements that are obtained, e.g., measured, by sensors associated with switch modules 608a-608g may be propagated by routers included in switch modules 608a-608g. Switch modules 608a-608g or, more specifically, sensors included in or associated with switch modules 608a-608g, have their time synchronized and, hence, measurements obtained by switch modules 608a-608g are time stamped so that measurements obtained by different switch modules 608a-608g may be compared relative to the same time. Thus, the state of network 600 at a particular time may be determined. Such a state may be stored and used, if a fault is detected, to determine how best to isolate a fault and to restore power to network 600.

Figure 6B:
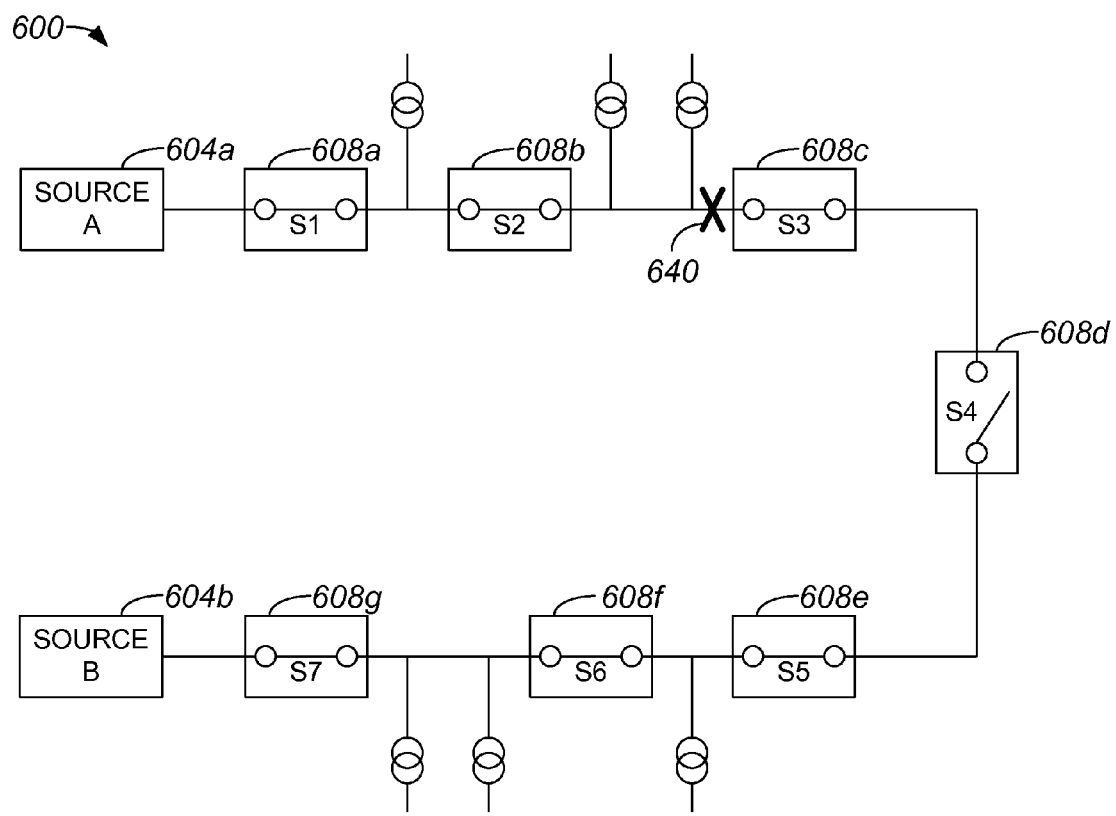
FIG. 6B is a diagrammatic representation of an electrical network at a time t2 when a fault occurs in an electrical network, e.g., electrical network 600 of FIG. 6A, in accordance with an embodiment.

At a time t2, a fault may occur in network 600. FIG. 6B is a diagrammatic representation of network 600 at time t2 when a fault occurs in accordance with an embodiment. A fault 640 occurs in network 600 at time t2, and occurs on a link or feeder line between switch 608b and switch 608c.

Figure 6C:
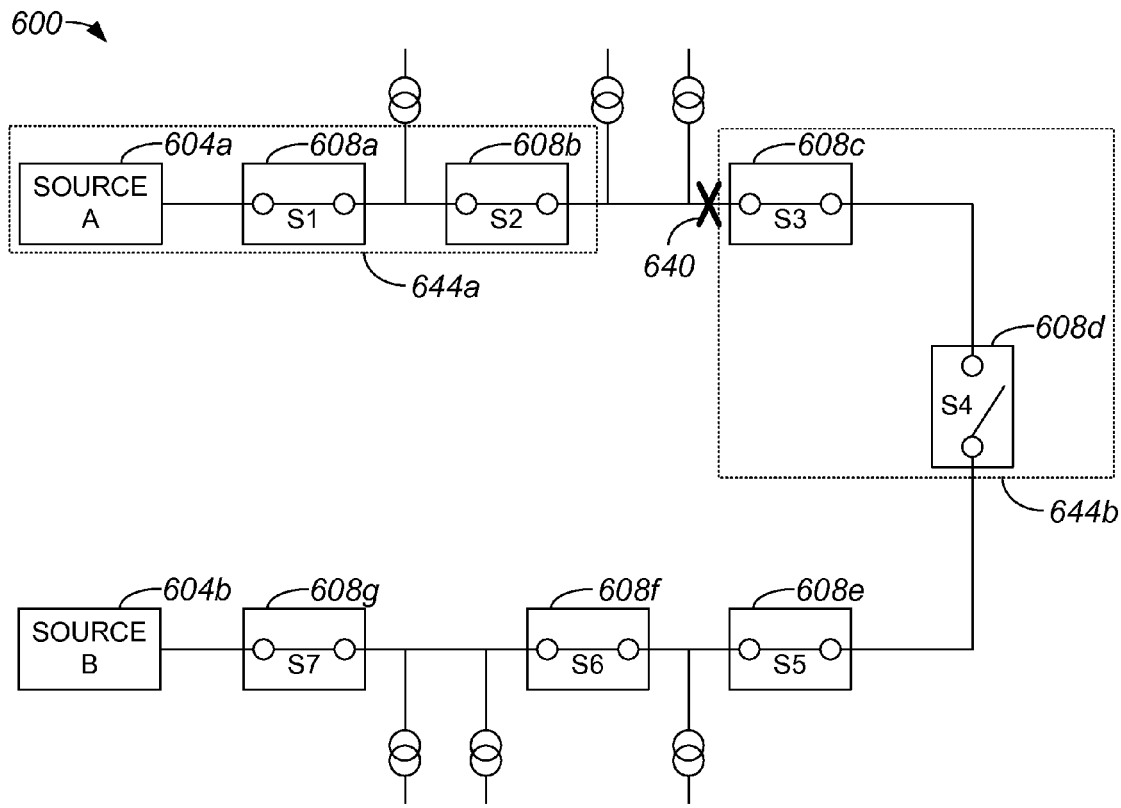
FIG. 6C is a diagrammatic representation of an electrical network at a time t3 when a fault, e.g., fault 640 of FIG. 6B, is detected in an electrical network, e.g., electrical network 600 of FIG. 6A, in accordance with an embodiment.

After fault 640 occurs, fault 640 may be detected by sources 604a, 604b and/or switches 608a-608g. FIG. 6C is a diagrammatic representation of network 600 at a time t3 when fault 640 is detected within network 600 in accordance with an embodiment. At time t3, sources 604a, 604b and/or switch modules 608a-608g may detect an abnormal current or voltage within network 600.

As shown, source 604a, switch 608a, and source 608b may detect an over current condition, or an abnormally high current. On the other hand, switch 608c and switch 608d may detect an under current condition or a lack of voltage. That is, within a first section 644a of network 600 an over current condition is detected, and within a second section 644b of network 600 the system detects that both sides of switch 608c and one side of switch 608d lost power. Effectively, upstream from fault 640, an over current condition is detected while downstream from fault 640, an under voltage condition is detected. In one embodiment, fault 640 may be detected less than approximately one millisecond (ms) after fault 640 occurs. When fault 640 is detected, the breakers in source 604a, switch 608a, and switch 608b may open immediately. In addition, the breakers in source 604a, switch 608a, and switch 608b may each send a fault indication by communicating their respective IDs, as well as an indication that an abnormal current level was detected, within first section 644a. Similarly, switch 608c and switch 608d may also exchange a fault indication.

Figure 6D:
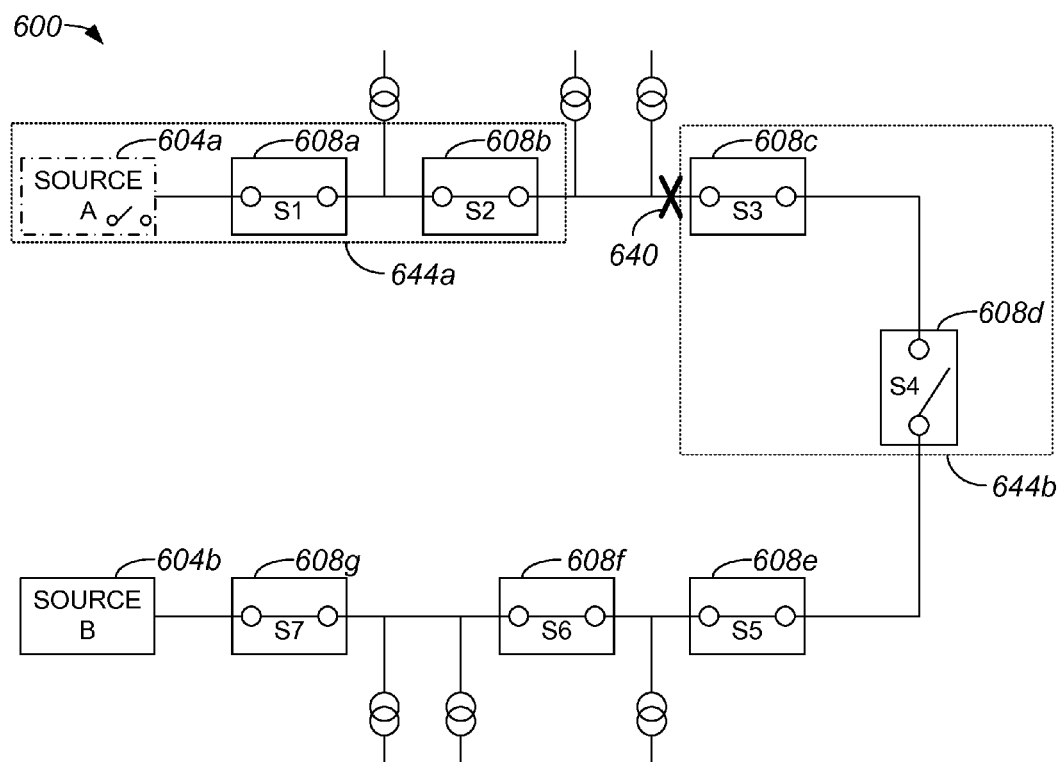
FIG. 6D is a diagrammatic representation of an electrical network at a time t4 when a circuit breaker, e.g., source A 604a of FIG. 6A, opens in an electrical network, e.g., electrical network 600 of FIG. 6A, in accordance with an embodiment.

In response to the detection of fault 640 within network 600, a circuit breaker included in source 604a trips, i.e., opens, at a time t4, as shown in FIG. 6D. The opening of the circuit breaker included in source 604a stops the flow of current from source 604a. It should be appreciated that while the amount of time that elapses between the detection of fault 640 and the opening of the circuit breaker included in source 604a may vary, the amount of time that elapses may be less than approximately 30 ms.

Figure 6E:
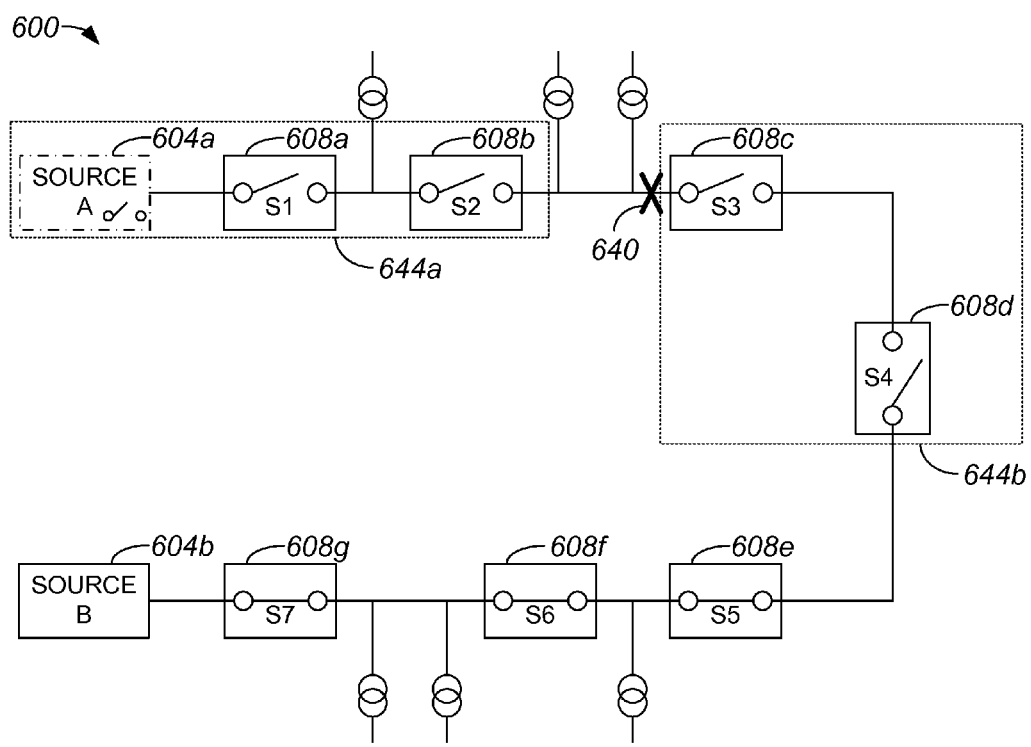
FIG. 6E is a diagrammatic representation of an electrical network at a time t5 after a circuit breaker, e.g., source A 604A of FIG. 6A, opens in an electrical network, e.g., electrical network 600 of FIG. 6A, in accordance with an embodiment.

FIG. 6E is a diagrammatic representation of network 604 at a time t5 after a circuit breaker associated with source 604A opens in accordance with an embodiment. At time t5, each of switch modules 608a-608d may determine or otherwise deduce whether it is located on a segment that is associated with fault 640. Such a determination may be made, in one embodiment, by comparing a most recent current and/or voltage measurement of each switch module 608a-608d, e.g., measurements stored during steady state operation of network 600, and by comparing the most recent current and/or voltage measurement to current and/or voltage measured approximately during the time the fault was detected.

The system may establish the topology of a feeder loop based on the steady state of the overall electric grid. Establishing the topology may include, but is not limited to including, identifying the power flow and identifying the parent-child relationship between substation power sources and various switches. For example, a switch S1 may identify a source A as its parent and switch S2 as its child. Similarly, switch S2 may identify switch S1 as its parent and switch S3 as its child. As a fault condition is detected, switches S1 and S2, as well as a breaker in source A, may declare that they have each experienced the fault current. Declarations or messages also typically convey information that indicates if any one of these switches was to remain open, then the fault current would likely be interrupted. In essence, each one of these switches may take ownership for the fault. In accordance with one embodiment, once a switch receives a communication from its child switch that the child switch may stop the fault current, the switch relinquishes the task for stopping the fault current to the child switch. Specifically, since the breaker in source A receives a message from switch S1 that switch S1 is capable of stopping the fault current, the breaker in source A closes, thereby allowing switch S1 to isolate source A from the fault. Similarly, when switch S1 receives a message from switch S2 that switch S2 is capable of stopping the fault current, then switch S1 closes, thereby allowing switch S2 to isolate the source from the fault. As switch S2 generally does not receive a fault current message from children of switch S2, switch S2 generally remains open while the breaker in source A and switch S1 close. Thus, a process of isolating a fault such as fault 640 of FIG. 6 from a source A is completed. Fault 640 may be classified by source 604a and switch modules 608a-608d as a sustained fault, or a fault that is unlikely to be a temporary fault that may resolve itself in a relatively short amount of time. Characterizing a fault as a sustained fault may include, but is not limited to including, determining when switch modules 608a-608d have detected a sustained fault current followed by a trip action associated with the opening of a breaker in source 604a. Once fault 640 is classified as a sustained fault, in the described embodiment, each switch module 608a-608d may claim ownership of fault 640 and notify other switch modules 608a-608d. In one embodiment, each switch module 608a-608c may open upon classifying fault 640 as a sustained fault. That is, each switch module 608a-608c may effectively open proactively upon identifying fault 640 as a sustained fault. Alternatively, however, switches 608a-608c may open regardless of whether a fault is classified as sustained or momentary.

Switch module 608b may notify switch module 608a that switch module 608b is willing to take ownership of fault 640. Such a notification is generally sent in a fault message. One embodiment of a fault message was discussed above with respect to FIG. 5. Switch module 608a may notify source 604a that switch module 608a is willing to take ownership of fault 640, and switch module 608c may notify switch module 608d that switch module 608c is willing to take ownership of fault 640. Switch 608c may notify other switches that switch 608c experienced reduced power, e.g., a relatively low voltage, on both sides of switch 608c. Additionally, switch 608d may notify other switches that switch 608d experienced reduced power, e.g., a low voltage, on one side of the switch. Notifications may be sent substantially simultaneously. In one embodiment, switch module 608a may acknowledge that switch module 608b is willing to take ownership, source 604a may acknowledge that switch module 608a is willing to take ownership, and switch module 608d may acknowledge that switch module 608c is willing to take ownership.

When switch module 608a obtains, e.g., receives, a notification that switch module 608b is willing to take ownership of fault 640, the indication is that switch module 608b is a child and switch module 608a is a parent in a parent-child relationship, e.g., a parent-child relationship identified during steady state operation of network 600. Similarly, when source 604a obtains a notification that switch module 608a is willing to take ownership of fault 640, the indication is that switch module 608a is a child and source 604a may effectively be a parent in a parent-child relationship.

Because switch module 608b has not received any notification that a child switch module, e.g., switch modules 608c, is willing to take ownership of fault 640, switch module 608b may essentially understand that it is to take ownership of fault 640. That is, because switch module 608b has not receive a notification that it has a child willing to take ownership of fault 640, switch module 608b is aware that switch module 608b should remain open during a subsequent restoration process. Also, as switch module 608c has effectively identified that its direct parent switch 608b took ownership of the fault, switch module 608c remains open so as to isolate the faulty segment.

Figure 6F:
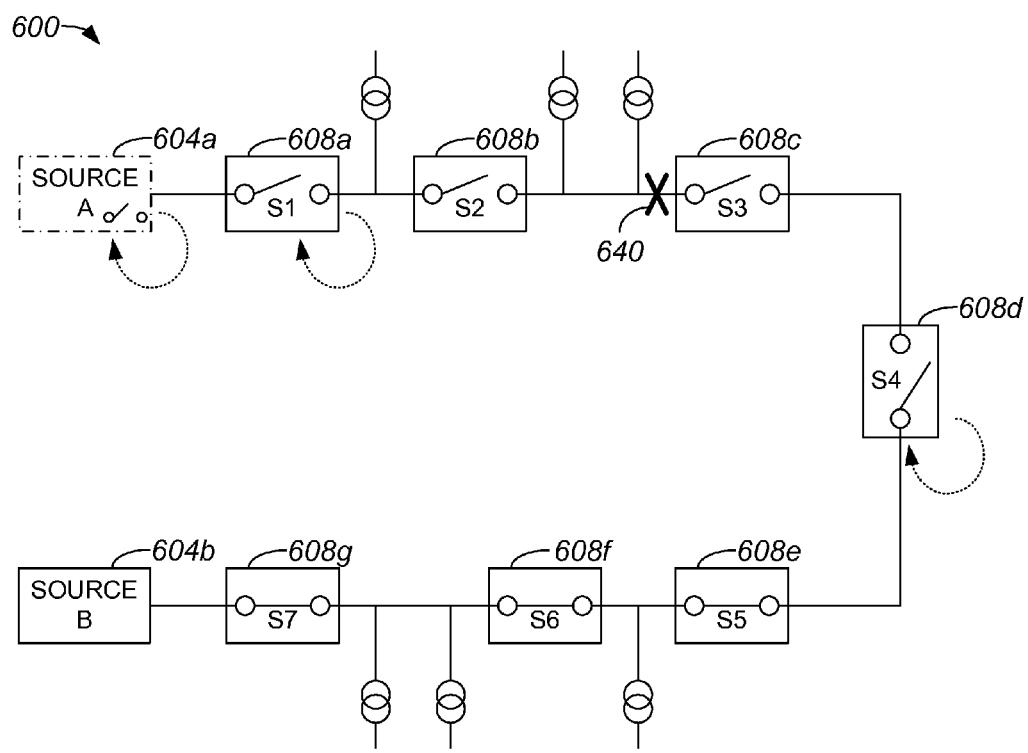
FIG. 6F is a diagrammatic representation of an electrical network at a time t6 when an electrical network, e.g., electrical network 600 of FIG. 6A, begins a restoration process in accordance with an embodiment.

Once it is identified that switch module 608b and switch module 608c are associated with a fault segment and, thus, are to take ownership of fault 640, a restoration process may begin. Each switch module 608a-608g may examine information obtained and stored during steady state operation of network 600, e.g., a contingency plan, and identifies a state that switch module 608a-608d is to implement. FIG. 6F is a diagrammatic representation of electrical network 600 at a time t6 when a restoration process begins in accordance with an embodiment. As shown, because switch module 608b has taken ownership of fault 640, source 604A may close its circuit breaker and switch module 608a may close its switch. Also, because switch module 608c has also been identified as a child of switch 608b and has taken ownership of fault 640, and therefore remains often, switch module 608d may also close its switch. Thus, power may be restored to substantially all segments with the exception of the faulty segment, i.e., the segment on which fault 640 is located between switch module 608b and switch module 608c. As a result, power may be promptly restored to segments that are downstream from the faulty segment.

It should be appreciated that if switch module 608e is unable to provide power needed to supply customers who obtain power from a segment between switch module 608c and switch module 608d without an overload condition arising, then switch module 608d, or switches (not shown) that may shed some of the customers who would otherwise obtain power from the segment, may remain open. Any additional switch modules (not shown) that may be located between switch module 608c and switch module 608d may remain open if necessary to prevent an overload condition.

Figure 6G:
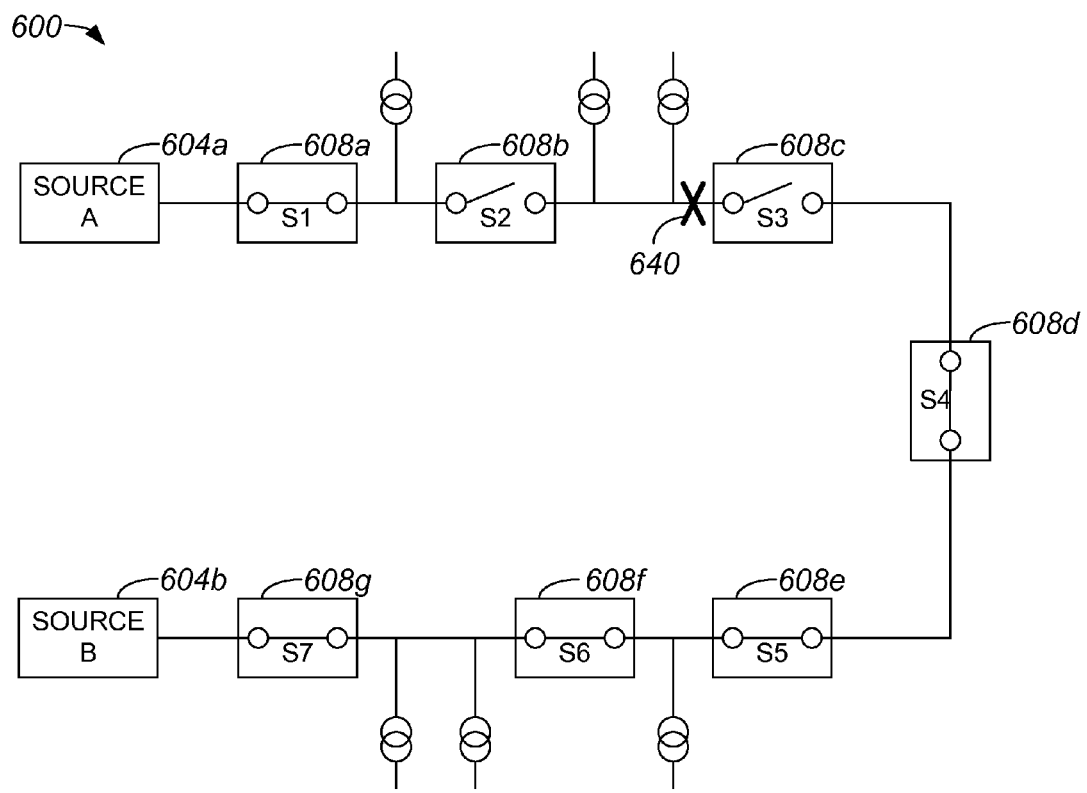
FIG. 6G is a diagrammatic representation of an electrical network at a time t7 when a restoration process is complete in accordance with an embodiment.

At a time t7, the restoration of electrical network 600 is effectively completed. FIG. 6G is a diagrammatic representation network 600 at time t7 when a restoration process is complete in accordance with an embodiment. When restoration is complete, switch module 608a and switch module 608d are closed, while switch module 608b and switch module 608c remain open. Fault 640 is isolated to a segment between switch 608b and switch 608c. Thus, source 604a supplies power to a segment between source 604a and switch module 608a, as well as to a segment between switch module 608a and switch module 608b. Power is restored to a segment between switch module 608c and switch module 608d by source 604b.

Figure 7:
FIG. 7 is a block diagram representation of an overall line switch module or a circuit breaker module in accordance with an embodiment.
Figure 7:
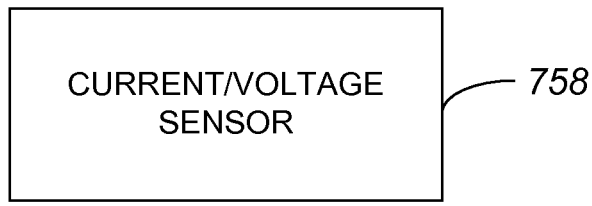
Figure 7:
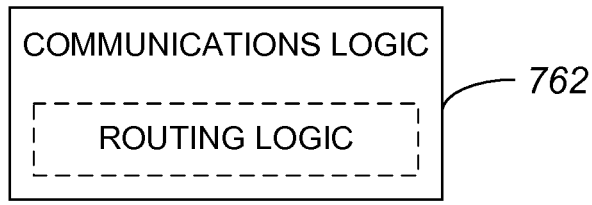
Figure 7:
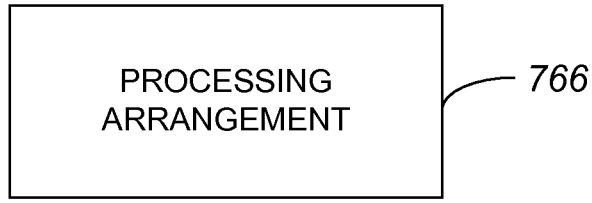
Figure 7:
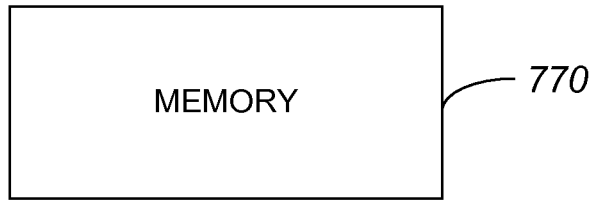

In general, a breaker and/or a switch is arranged to open when a fault such as a high current condition is detected, or when a switch detects that the voltage on both of sides of the switch was substantially reduced, e.g., dropped to zero. A switch may be part of an overall switch module which includes functionality in addition to the ability to open and close when a fault is detected. FIG. 7 is a block diagram representation of an overall line switch module in accordance with an embodiment. A line switch module 708 includes a switch 754 and a current and/or voltage sensor 758. In one embodiment, switch 754 is arranged to open when current or voltage sensor 758 senses a high current condition, senses a substantially reduced voltage on both sides of switch 754, or otherwise determines that there is a high current condition in an electrical network that switch module 708 is a part of. Sensor 758 may generally be a directional sensor that is capable of identifying a direction, for example, in which a high current is flowing.

As previously mentioned, functionality that allows for information relating to switch 754 or, more generally, switch module 708, to effectively be communicated to other switch modules (not shown) and/or a substation may be included in switch module 708. That is, switch module 708 may essentially be a system that provides electrical switching capabilities and communications capabilities. Communications logic 762 allows fault messages, and other notifications, to be generated and to be communicated on a communications network, e.g., an IP network. Communications logic 762 may also allow fault messages, as well as other notifications, to be received. In one embodiment, communications logic 762 includes routing logic such that switch module 708 may effectively operate as a router. It should be appreciated that during normal operation mode, communications logic 762 typically facilitates the exchange of normal operations parameters such as normal current, voltage, power factor and/or other grid states between various elements of the grid.

Switch module 708 also includes a processing arrangement 766 that is configured to process information obtained, for example, from sensor 758 and/or communications logic 762. Processing arrangement 766 may process information obtained from other grid elements through communications logic 762, and may also process information to be provided through communications logic 762 to other grid elements. Processing arrangement 766 may also generally be arranged to execute software logic such as software logic associated with establishing parent-child relationships, planning contingency plans prior to the occurrence of a fault condition, identifying a fault location, isolation, and/or restoration. Memory 770 included in switch module 708 may store, but is not limited to storing, software logic in the form of computer-readable program code, information obtained from sensor 758, and information obtained through communications logic 762. It should be understood that although switch module 708, communications logic 762, and processing arrangement 766 are described as embodied on a single device, such components may reside in a single module or may be otherwise be coupled via a network a bus or any other suitable coupling arrangement.

Although only a few embodiments have been described in this disclosure, it should be understood that the disclosure may be embodied in many other specific forms without departing from the spirit or the scope of the present disclosure. By way of example, while a communications network such as an IP network has been described as overlaying an electrical network such that information from or associated with components of the electrical network may be communicated, it should be appreciated that in some embodiments, other methods for distributing information from or associated with components may be utilized.

In one embodiment, the total amount of time between the detection of a fault and a restoration of an electrical network in response to the detection of the fault may be a function of a speed of a circuit breaker fault detection and opening time, a neighbor switch to neighbor switch communication latency, and a maximum number of communications hops from a switch and a router which own a failure to a substation breaker. By way of example, the total amount of time between the detection of a fault and a restoration of an electrical network may be approximately equal to the sum of a neighbor switch to neighbor switch communication latency and a maximum number of communications hops from a switch and a router which own a fault to a substation breaker, added to a circuit breaker fault detection and opening time. A total customer outage time, in such an embodiment, may be approximate equal to the sum of a neighbor switch to neighbor switch communication latency and a maximum number of communications hops from a switch and a router which own a failure to a substation breaker. For many deployments, a total outage time may be on the order of between approximately 50 ms and 100 ms.

The configuration of a communications network that overlays an electrical network may vary widely. For instance, a communications network may be a wired communications network or a wireless communications network. In one embodiment, a communications network may include both wired and wireless communications links As mentioned above with respect to FIG. 6E, when a fault is detected, a switch module may compare its most recent, e.g., stored just prior to a fault occurrence, current and/or voltage measurement to the most recent current or voltage measurements of all other switch modules affected by the fault to determine whether it should take ownership of the fault, or whether one of its children took ownership of the fault. In general, the switch module with the lowest recent current value is designated to be the child that takes ownership of the fault, and informs other affected switch modules, e.g., parents and/or peer switch modules, that it has ownership of the fault. It should be appreciated that before any fault is detected, switches exchange current and/or voltage information and establish parent-child relationships. Typically, a child switch closest to a detected fault that does not have its own child switch that is willing to assume ownership of the fault is the switch that owns the fault and, as such, remains open. A peer switch module may challenge the ownership of the fault, as for example if the peer switch module believes it has the lowest recent current value. The need for peer switch modules to communicate with each other after a fault is detected is reduced, as the peer switch modules generally do not need to communicate except to claim ownership and, in some cases, to challenge a claim of ownership.

A line switch, or a switch included in an overall switch module, may be unable in some cases to interrupt large fault currents. In other words, some if not substantially all line switches may not be equipped to open when a very high current condition or rush occurs, or when there is a relatively large voltage at the source. Therefore, when a fault condition such as a high fault current is detected, the breaker at the substation which is designed to open under high current conditions opens substantially immediately, thereby cutting off the high fault current. Switches sense a loss of power following a surge of current due to a fault, as well as a drop in a current level, and open in response. The switches may update each other regarding the relatively quick change of grid parameters, as for example changes in current, voltage, power factor, etc. over a communications network such as communications network 102. Faults in a network or on a grid have generally been described as being associated with a high current rush or a high amount of current. It should be appreciated, however, that a fault in a network is not limited to being associated with a high current rush or a high amount of current. By way of example, a fault may generally be associated with an abnormal amount of current. In addition, a fault may also be associated with an abnormal amount of voltage. It should be appreciated that an abnormal amount of current and/or an abnormal amount of voltage may generally be any unusual or unexpected amount of current and/or voltage detected within an electrical network.

In one embodiment, after a fault is isolated, pre-calculated contingency plans may be activated to restore power to a network. That is, contingency plans formulated during steady state operation of a network may be implemented to restore power in the network using alternate sources after a fault is isolated.

The embodiments may be implemented as hardware and/or software logic embodied in a tangible medium that, when executed, e.g., by a processing arrangement or system associated with a switch module or a substation, is operable to perform the various methods and processes described above. That is, the logic may be embodied as physical arrangements, modules, or components. A tangible medium may be substantially any suitable physical, computer-readable medium that is capable of storing logic which may be executed, e.g., by a processing system such as a computer system, to perform methods and functions associated with the embodiments. Such computer-readable media may include, but are not limited to including, physical storage and/or memory devices. Executable logic may include code devices, computer program code, and/or executable computer commands or instructions that may be embodied on computer-readable media.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   obtaining information relating to a steady state operation of a portion of an electrical network, the electrical network including a plurality of components, the information being obtained from the plurality of components while the portion of the electrical network is operating at steady state, wherein the information is obtained through a communications network that at least partially overlays the electrical network;
   detecting a fault in the electrical network, wherein the fault is detected by at least a first component of the plurality of components; and
   restoring the electrical network, wherein restoring the electrical network includes determining when the first component owns the fault, and wherein determining when the first component owns the fault includes at least processing the information obtained from the plurality of components.

2. The method of claim 1 wherein the first component includes a first switch, and wherein when it is determined that the first component owns the fault, the method further includes maintaining the first switch in an open position.

3. The method of claim 2 wherein when it is determined that the first component owns the fault, the method further includes:
   notifying the plurality of components that the first component owns the fault.

4. The method of claim 2 wherein the plurality of components includes a second component, the second component including a second switch and being a neighbor of the first component, wherein when it is determined that the first component owns the fault, the second switch is closed.

5. The method of claim 4 wherein obtaining the information relating to the steady state operation includes characterizing a plurality of parent-child relationships in the portion, and wherein characterizing the plurality of parent-child relationships includes characterizing at least a first parent-child relationship by identifying the second component as being a parent and the first component as being a child of the parent.

6. The method of claim 2 wherein the plurality of components includes a second component and a third component, the second component including a second switch and being a neighbor of the first component, wherein the third component experiences a loss of power on both sides of the component and remains open, wherein when it is determined that the first component owns the fault, the second switch is closed.

7. The method of claim 1 wherein the first component includes a first switch, and wherein when it is determined that the first component does not own the fault, the method further includes maintaining the first switch in a closed position.

8. The method of claim 1 wherein the information includes a first amount of current associated with the first component and at least a second amount of current associated with a second component of the plurality of components, and wherein comparing the information obtained from the plurality of components includes determining whether the first amount of current is less than the second amount of current.

9. The method of claim 8 wherein when it is determined that the first amount of current is less than the second amount of current, the first component is identified as a child of the second component and owns the fault, wherein it is determined before the fault is detected that the first amount of current is less than the second amount of current.

10. A non-transitory computer-readable storage medium comprising computer program code, the computer program code, when executed, configured to:
   obtain information relating to a steady state operation of a portion of an electrical network, the electrical network including a plurality of components, the information being obtained from the plurality of components while the portion of the electrical network is operating at steady state, wherein the information is obtained through a communications network that at least partially overlays the electrical network;
   detect a fault in the electrical network, wherein the fault is detected by at least a first component of the plurality of components; and
   restore the electrical network, wherein restoring the electrical network includes computer code configured to determine when the first component owns the fault, and wherein the computer code that determines when the first component owns the fault includes computer code that processes the information obtained from the plurality of components.

11. The non-transitory computer-readable storage medium of claim 10 wherein the first component includes a first switch, and wherein when it is determined that the first component owns the fault, the computer program code is further configured to maintain the first switch in an open position.

12. The non-transitory computer-readable storage medium of claim 11 wherein when it is determined that the first component owns the fault, the computer program code is further configured to:
   notify the plurality of components that the first component owns the fault.

13. The non-transitory computer-readable storage medium of claim 11 wherein the plurality of components includes a second component, the second component including a second switch and being a neighbor of the first component, wherein when it is determined that the first component owns the fault, the second switch is closed.

14. The non-transitory computer-readable storage medium of claim 13 wherein the computer program code that obtains the information relating to the steady state operation is further configured to characterize a plurality of parent-child relationships in the portion, and wherein the computer program code that is configured to characterize the plurality of parent-child relationships is further configured to characterize at least a first parent-child relationship and to identify the second component as being a parent and the first component as being a child of the parent.

15. The non-transitory computer-readable storage medium of claim 11 wherein the plurality of components includes a second component and a third component, the second component including a second switch and being a neighbor of the first component, wherein the third component experiences a loss of power on both sides of the component and remains open, wherein when it is determined that the first component owns the fault, the second switch is closed.

16. The non-transitory computer-readable storage medium of claim 10 wherein the first component includes a first switch, and wherein when it is determined that the first component does not own the fault, the computer program code is further configured to maintain the first switch in a closed position.

17. The non-transitory computer-readable storage medium of claim 10 wherein the information includes a first amount of current associated with the first component and at least a second amount of current associated with a second component of the plurality of components, and wherein the computer program code that compares the information obtained from the plurality of components is further configured to determine whether the first amount of current is less than the second amount of current.

18. The non-transitory computer-readable storage medium of claim 17 wherein when it is determined that the first amount of current is less than the second amount of current, the first component is identified as a child of the second component and owns the fault, wherein it is determined before the fault is detected that the first amount of current is less than the second amount of current.

19. An apparatus comprising:
   a switch arrangement, the switch arrangement being arranged to open and to close, wherein a current flows through the switch arrangement when the switch arrangement is closed and wherein the current does not flow through the switch arrangement when the switch arrangement is open;
   a sensor arrangement, the sensor arrangement being arranged to detect at least one selected from a group including an amount of current and an amount of voltage; and
   a communications arrangement, the communications arrangement being arranged to enable the apparatus to provide and to obtain messages, wherein the communications arrangement is configured to generate and to provide a message when the sensor arrangement detects that at least one selected from the group including the amount of current and the amount of voltage while the apparatus is operating at a steady state, the message being provided on a communications network associated with the apparatus.

20. The apparatus of claim 19 wherein the communications arrangement is a routing arrangement.

21. The apparatus of claim 19 wherein the sensor arrangement is further arranged to detect when the at least one selected from the group including the amount of current and the amount of voltage is at an abnormal level, and wherein the communications arrangement is still further arranged to generate and to provide a fault message when the sensor arrangement detects that at least one selected form the group including the amount of current and the amount of voltage is at the abnormal level, the fault message being provided on the communications network.

22. The apparatus of claim 21 wherein the fault message is configured to identify at least the apparatus and the abnormal level.

23. The apparatus of claim 19 wherein the apparatus is included on an electrical network, the communications arrangement is arranged to obtain a first message from a neighbor on the electrical network, the first message being arranged to indicate a state of the neighbor, the apparatus further including:
- a processing arrangement, the processing arrangement being arranged to process the first message to obtain information relating to one selected from a group including a current and a voltage associated with the neighbor; and
- a memory, the memory being arranged to store the information.

24. The apparatus of claim 23 wherein the sensor arrangement is arranged to detect a fault on the electrical network, and wherein the processing arrangement is arranged to utilize at least the information to determine if the apparatus has ownership of the fault.

* * * * *